June 26, 1923.
R. B. HOLMES
1,460,338
FLEXIBLE JOINT
Original Filed Dec. 11, 1919
2 Sheets-Sheet 1
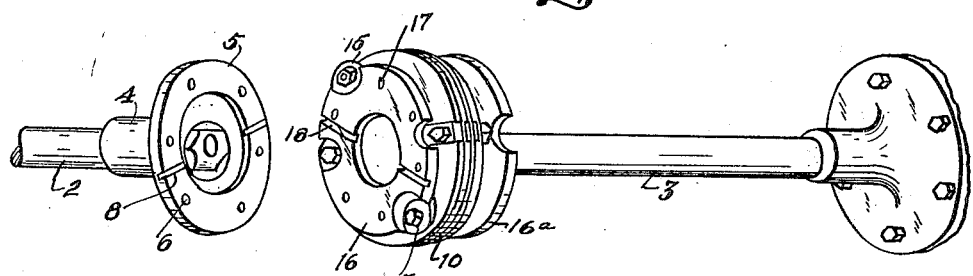
Fig.1
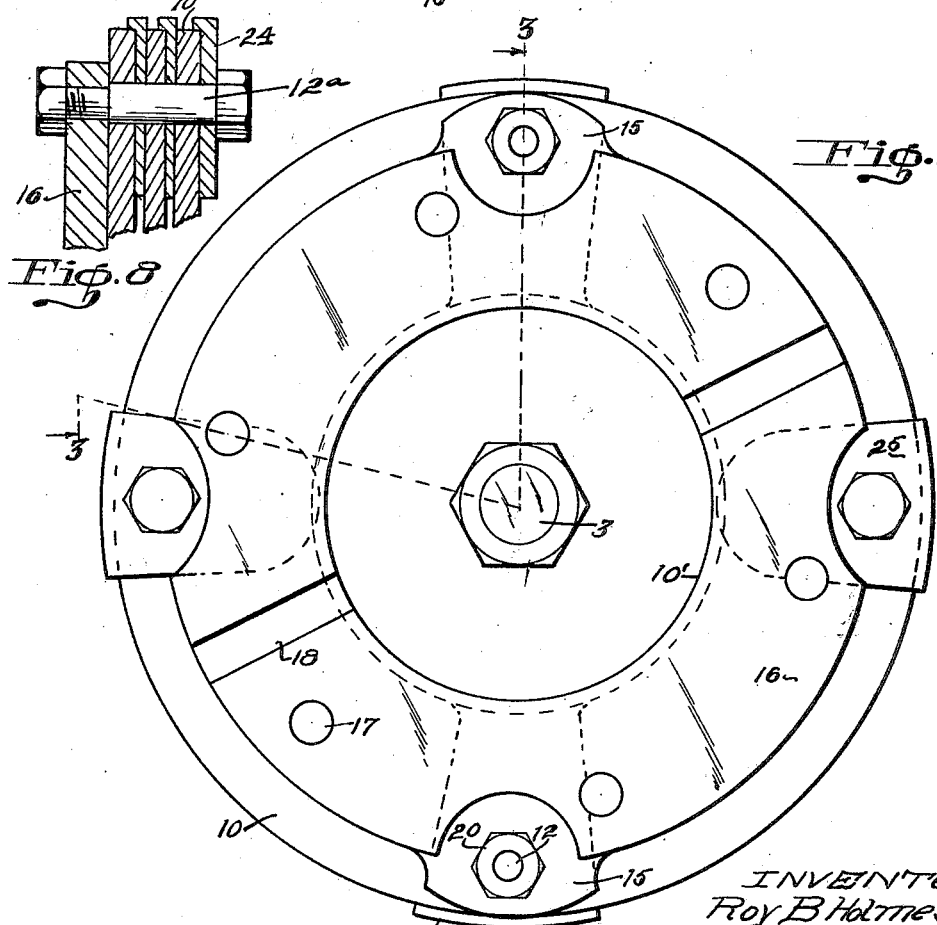
Fig.2
Fig.8
INVENTOR
Roy B Holmes
BY Hazard & Miller
Attys.

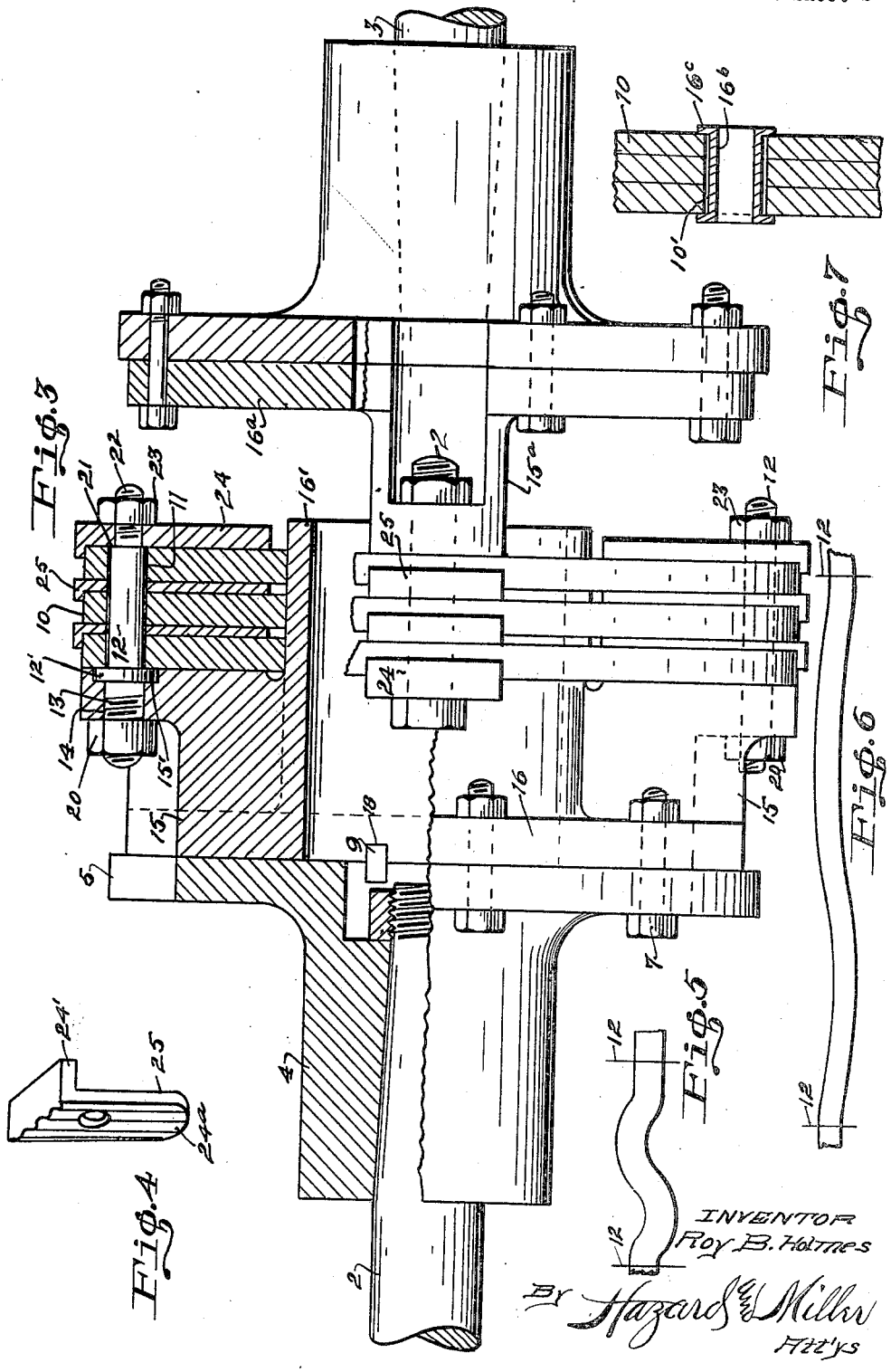

Patented June 26, 1923.

1,460,338

UNITED STATES PATENT OFFICE.

ROY B. HOLMES, OF LOS ANGELES, CALIFORNIA; NELLIE I. HOLMES, ADMINISTRATRIX OF SAID ROY B. HOLMES, DECEASED, ASSIGNOR, BY MESNE ASSIGNMENTS, TO A. W. SALINE.

FLEXIBLE JOINT.

Application filed December 11, 1919, Serial No. 344,158. Renewed December 29, 1922.

*To all whom it may concern:*

Be it known that I, ROY B. HOLMES, a citizen of the United States, residing at Los Angeles, in the county of Los Angeles and State of California, have invented new and useful Improvements in Flexible Joints, of which the following is a specification.

This invention relates to flexible joints and particularly to flexible joints of the type involving a laminated or flexible transmission device for transmitting rotary motion from driving to a driven member and which may have relative angular play or in which the driving or driven members may operate out of alinement, and an object of the invention is to provide for the bodily removal of a flexible unit organization with respect to two fittings carried by the driving and the driven members or parts. Another object is to provide a flexible joint unit in which the flexible members can be assembled prior to installation in the organization and compressed to the desired limited degree to secure an improvement in their durability; to provide a central support for the flexible disc or discs utilized in the transmission device and to provide improved means for clamping the discs in superposed relation and to secure other objects as will be made manifest hereinafter; embodiments of the invention being illustrated in the accompanying drawings and described and claimed herein.

Figure 1 is a perspective of the improved transmission unit shown as applied to a rotating element with a complementary member detached therefrom.

Fig. 2 is a plan or face view of the coupler end of the transmission unit.

Fig. 3 is a side elevation broken away on line 3—3 of Fig. 2 and showing the unit as connected to fittings on contiguous ends of rotary shafts.

Fig. 4 is a perspective looking toward the friction face of one of the spacers.

Fig. 5 is an edge view of a portion of a disc illustrating diagrammatically the position the disc edge assumes between two adjacent fastening means passing through the disc when they are relatively close.

Fig. 6 illustrates diagrammatically the position the edge of the disc assumes when the fastening means are spaced a greater distance than in Fig. 5.

Fig. 7 is a diametrical section through a set of the flexible members showing a modified form of central support for the same.

Fig. 8 shows a modified form of the bolt.

In the present case the invention is shown in an organization in which 2 represents a driving shaft and 3 the driven shaft, as for instance the propeller shaft of an automobile, the contiguous ends of these shafts being provided with fittings that may vary in design of construction and which are shown here as comprising hubs 4 with diametrically extending flanges or face plates 5 perforated at suitable intervals by apertures 6 to receive fastening bolts or other suitable means 7, Fig. 3; the end faces of the flanges 5 being generally plane and preferably provided with a suitable number of radially disposed key seats 8 to receive complementary keys 9 which firmly interlock with coupling members to be described here below and forming a part of a bodily removable flexible unit transmission device.

The flexible transmission device consists, preferably, of a plurality of flexible discs 10 of suitable tenacious material, such for instance as laminæ of fabric or laminæ of cords or threads suitably securely interbonded as by vulcanization so that each disc serves as a flexible tension member to connect the driving and the driven shafts 2—3.

The discs 10, Figs. 2 and 3, are provided with transverse apertures 11 angularly spaced in a circle as determined by the number of fastening means comprising bolts 12 passed through the superposed discs 10, and preferably these bolts are diametrically oppositely disposed in the discs 10 and the thus oppositely disposed bolts 12 have threaded ends 13 to pass into apertures provided therefor at 14 in diametrcally opposite lugs or dogs 15 extending inwardly from one side of a coupling member or disclike part 16 which has a series of apertures 17 to take the bolts or screws 7 and by which latter the plane diametrical face of the coupling 16 is drawn snugly against the contiguous face of the fitting 5. The keys 9, above referred to, also seat in respective keyways 18 formed in the plane end face of the coupling 16 and therefore interlock these members against relative slipping and for positive driving connection together.

It is desirable that the coupling unit have its several flexible transmission discs 10 compressed to a uniform and suitable degree which is determined at the time of the assembly of the parts so as to protect the discs against excessive pressure and subsequent rapid wear and destruction while in use, and therefore the bolt 12 is provided with a shoulder 12' seating against an adjacent rebated shoulder 15' that will be drawn tightly against its seat when the unt 20 is turned up on the threads 14. The opposite end of the bolt 12 is turned down to form a shoulder 21 and is threaded at 22 to take a nut 23 to screw up tightly against a washer or friction plate 24, illustrated in detail in Fig. 4, by which the interposed discs 10 are compactly assembled and held on the bolt 12, the discs preferably being separated by or forced against intermediate washers or friction members 25 similar to the friction washer 24 excepting that the inner friction plates 25 are thinner than the outermost plate 24.

When the several flexible transmission discs 10 are assembled successively in place on the bolts 12 with the intermediate friction plates 25 the same will have a thickness somewhat greater than the length of the body of the bolt 12 between the collar 12' and the end shoulder 21 and therefore when the fastening nuts 23 are set up the discs will be compressed to a limited and predetermined degree as the outer friction plate or washer 24 comes into contact with the shoulder 21 of the respective bolts 12.

It is desirable that the friction of the discs upon the interposed friction plates be utilized to transmit the power rather than to depend upon the walls of the holes provided for the bolts 12 to take the strains, and therefore the friction plates 24—25 are made of considerable area and are substantially oblong in plan view with inwardly turned flanges 24' at one end of each washer as 25, this flange curved to correspond to the curvature of the edge of the respective disc and therefore hold the friction plate 24 against relative movement on its disc 10. To secure the maximum friction as between the discs and an interposed friction plate 25, either or both of the said faces of the plates 25 may be corrugated as at 24$^a$, the lines of the corrugations preferably being disposed radial as to the center of the discs.

In the embodiment of the invention shown, each of the discs 10 is provided with holes at 90° apart to receive the bolts 12 and one set of bolts are passed through the lugs 15 extending inwardly from one coupler 16 whilst another pair or set of bolts is passed in the opposite direction as seen in Fig. 3 to take through lugs 15$^a$ on another coupler plate 16$^a$ which is the duplicate of the plate 16 except that the latter is provided with a concentric and inwardly extending sleeve or hub portion 16' the circumference of which has a free working fit in the bore or central aperture 10' of the discs 10 so that the surface of the bore 10' of each disc is more or less supported by the contiguous cylindrical surface of the sleeve or hub 16'.

It is intended that a complete unit comprising a suitable number of the discs 10 and oppositely disposed couplers 16 and 16$^a$ be assembled to form a complete unit in which the discs 10 will be compressed to the desired degree by the fastening bolts 12 which secure the discs to respective coupling members at suitable angular intervals.

In Fig. 7 there is shown a slightly modified form of means for reinforcing or supporting the edges 10' of the discs 10, and in this case a sleeve 16$^b$ is fitted into the hole formed by the discs, the sleeve having outwardly turned flanges or beads 16$^c$ to lap over the adjacent corners of the end discs of the set.

It is preferable that the driving lugs 15—15, for instance, of the coupler 16 be spaced 180° apart and that these lugs be spaced 90° apart from the opposite lugs 15$^a$ of the coupler 16$^a$ so as to get a considerable length or area of zone as between each of the bolts 12 around the arc of the discs 10 to reduce the degree of transverse or lateral buckling of the quadrant of a disc 10, as is indicated in Fig. 5, resulting from the compression of the section of the disc between the bolt lines indicated at 12—12.

When the bolt lines 12—12 are comparatively close, as would be the case when each of the coupler members 16—16$^a$ are provided with more than two driving lugs, a very considerable degree of buckling occurs and this is overcome as the distance between the fastening bolts 12—12 is increased, as shown in Fig. 6, in which there is a greater length of the flexible material interposed between the successive bolts 12; this comparison being taken as with respect to discs of the same size in a flexible joint provided with more than four fastening bolts.

It is understood that the means for fastening the discs 10 can be directly secured in the fitting on the driving part or shaft 2 and the driven fitting on the shaft 3, and in Fig. 8 a modified form of the fastening device is shown as including a shoulder bolt 12$^a$ having the usual head at one end and a reduced threaded shank at its opposite end that may be secured in the intermediate coupling member as 16 or the driving or driven part or fitting as 4, Figs. 1 and 3.

It will be seen that in the use of the shoulder bolt 12$^a$ the degree of compression of the discs 10 will be determined by the length of the body of the bolt between its head and the shoulder at the reduced threaded part.

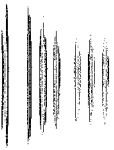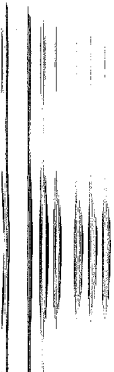

Various changes may be made without